United States Patent [19]

Ellis

[11] Patent Number: 5,860,452

[45] Date of Patent: Jan. 19, 1999

[54] PULSATION DAMPENER

[76] Inventor: Harrell P. Ellis, 5133 Northeast Pkwy., Fort Worth, Tex. 76106

[21] Appl. No.: 54,077

[22] Filed: Apr. 2, 1998

[51] Int. Cl.$^6$ ..................................................... F16L 55/04
[52] U.S. Cl. ................................. 138/30; 138/42; 138/26
[58] Field of Search ................................ 138/30, 31, 26, 138/42; 220/720, 721, 723

[56] References Cited

U.S. PATENT DOCUMENTS

| | | | |
|---|---|---|---|
| 3,063,470 | 11/1962 | Forster | 138/30 |
| 4,705,077 | 11/1987 | Sugimura | 138/30 |
| 4,732,176 | 3/1988 | Sugimura | 138/30 |
| 4,759,387 | 7/1988 | Arendt | 138/30 |
| 4,979,441 | 12/1990 | Welch et al. | 138/30 |
| 5,735,313 | 4/1998 | Jenski, Jr. et al. | 138/30 |

*Primary Examiner*—Patrick F. Brinson
*Attorney, Agent, or Firm*—Jerry C. Ray

[57] ABSTRACT

A pulsation dampener or desurger for use in sterile or other high-temperature applications such as food- or pharmaceutical-processing plants has an outer case surrounding a concentric perforated mandrel. Flanges or other connectors provide for attachment to a piping system so that product flows through the mandrel. Enclosing the mandrel is a liner of polytetrafluoroethylene or other fluoropolymer; the liner in turn is enclosed by a resilient sheath which may be integral with the liner. Between the liner and the mandrel is a pressure chamber which fluctuates in volume responsive to surges in line pressure, dampening the amplitude of the surges. Expansion of liner and sheath is limited by pressure within a gas chamber in the region between sheath and case.

6 Claims, 3 Drawing Sheets

5,860,452

PULSATION DAMPENER

CROSS REFERENCE TO RELATED APPLICATIONS

Not applicable.

BACKGROUND OF THE INVENTION

1. Field of the Invention

This invention relates to pulsation dampeners or desurgers which dampen pressure fluctuations in piping, and in particular to such pulsation dampeners suitable for use under conditions of high temperature, high pressure, and sterility in the food-processing, pharmaceutical, and semi-conductor industries.

2. Description of the Related Art

Left unchecked, pressure pulsations from positive-displacement pumps and from rapidly-closing valves can cause a variety of problems in a piping system. Among these problems are inaccurate readings from on-line measuring devices, inaccurate performance by on-line metering systems, high levels of vibration, and in some cases even component failure. Rapid fluctuations in line pressure may exceed the response time of gauges and metering systems, resulting in erroneous readings and output signals. Filter systems are also susceptible to damage from pressure spikes and surges; larger particles may be forced through the filtration medium, and filter elements can be ruptured by undampened pressure surges.

Pulsation dampeners absorb pump pulsations and pressure surges (due to, e.g., valve ckisyres) reducing the amplitude of pressure fluctuations in the piping system. Types of pulsation dampeners include accumulators, which may be of the through-flow type or may be attached to the piping system as an appendage. Accumulators typically retain some of the material flowing through the system, leading to contamination problems as described below. Another type of pulsation dampener is the in-line type; the present invention is in this category. "Desurger," as used herein, refers to an in-line pulsation dampener.

Generally all pulsation dampeners include a bladder or diaphragm defining a gas-filled chamber which fluctuates in volume in response to changes in line pressure. Surges in line pressure compress gas in the chamber and cause the gas volume to decrease; the dampening is efficient because the gas volume is equivalent to a much larger volume of liquid. Desurgers may be attached to a line as an appendage which is linked to the line via a connection, or may be of the in-line type, in which the entire line contents flow through the desurger.

One problem with accumulator-type pulsation dampeners is the material retained within the accumulator between surges. In some piping systems the interval between surges may be several hours or longer, especially where the surges are caused by valve closures. These long intervals allow deterioration of material trapped in the accumulator chamber, and in some cases even bacterial growth. Subsequent surges replace some of the aged material in the accumulator chamber with new material; the material flushed from the chamber is mixed with and contaminates product flowing through the piping system.

Another problem is that previous desurgers were restricted to maximum operating temperatures well below the boiling point of water, with only intermittent use at higher temperatures. For liquids at higher temperatures, a desurger had to be connected as an appendage to the line being protected. This type of connection requires a section of liquid-filled pipe which forms a barrier or "cold seal" between the hot line and the desurger. The problem inherent with this arrangement, however, is similar to that described for accumulator-type dampeners; liquid from the cold seal section is periodically mixed with and introduced into the main product line. In high-sterility systems for processing food products and pharmaceuticals, etc., such mixing is unacceptable.

The problem addressed by the present invention is how to adapt desurgers for use in the food and pharmaceutical industries, and in other applications which require processing under conditions ensuring sterility.

SUMMARY OF THE INVENTION

The present invention is an in-line desurger which dampens pressure pulsations and surges in piping systems. An outer case encloses a cylindrical, perforated mandrel through which product material flows. Caseheads at either end of the case include flanges or other means for connecting the desurger to a pipe line. Tightly encasing the mandrel is a resilient liner and sleeve assembly; the liner and sleeve may be integral, or may move independently of each other. Between sleeve and case is a gas chamber, which is pressurized sufficiently to hold the liner and sleeve against the outer surface of the mandrel. A relatively inert gas, such as nitrogen, is introduced into the gas chamber through a loading valve in the case.

Orifices or perforations in the mandrel wall allow pressure pulses to be transmitted through the wall to the liner; the liner and sleeve flex outward, decreasing the volume of the outer gas chamber as the volume of the pressure chamber increases. The liner is preferably made of polytetrafluoroethylene, which is resistant to high temperatures, corrosive liquids, etc. Use of the fluoropolymer liner allows the desurger to be incorporated into piping systems handling food products, pharmaceuticals, cosmetics, or other materials which require sterile conditions.

Based on the above, it is an object of this invention to provide an in-line desurger which may be used under conditions of high temperature.

It is a further object to provide a desurger which may be used in piping systems used for food processing, pharmaceuticals processing, and semiconductor manufacture, i.e., under sterile conditions.

Further objects are to achieve the above with devices that are compact, durable, simple, efficient, and reliable, yet inexpensive and easy to install and operate.

The specific nature of the invention, as well as other objects, uses, and advantages thereof, will clearly appear from the following description and from the accompanying drawings, the different views of which are not necessarily scale drawings.

CATALOG OF THE ELEMENTS

Figure 1:
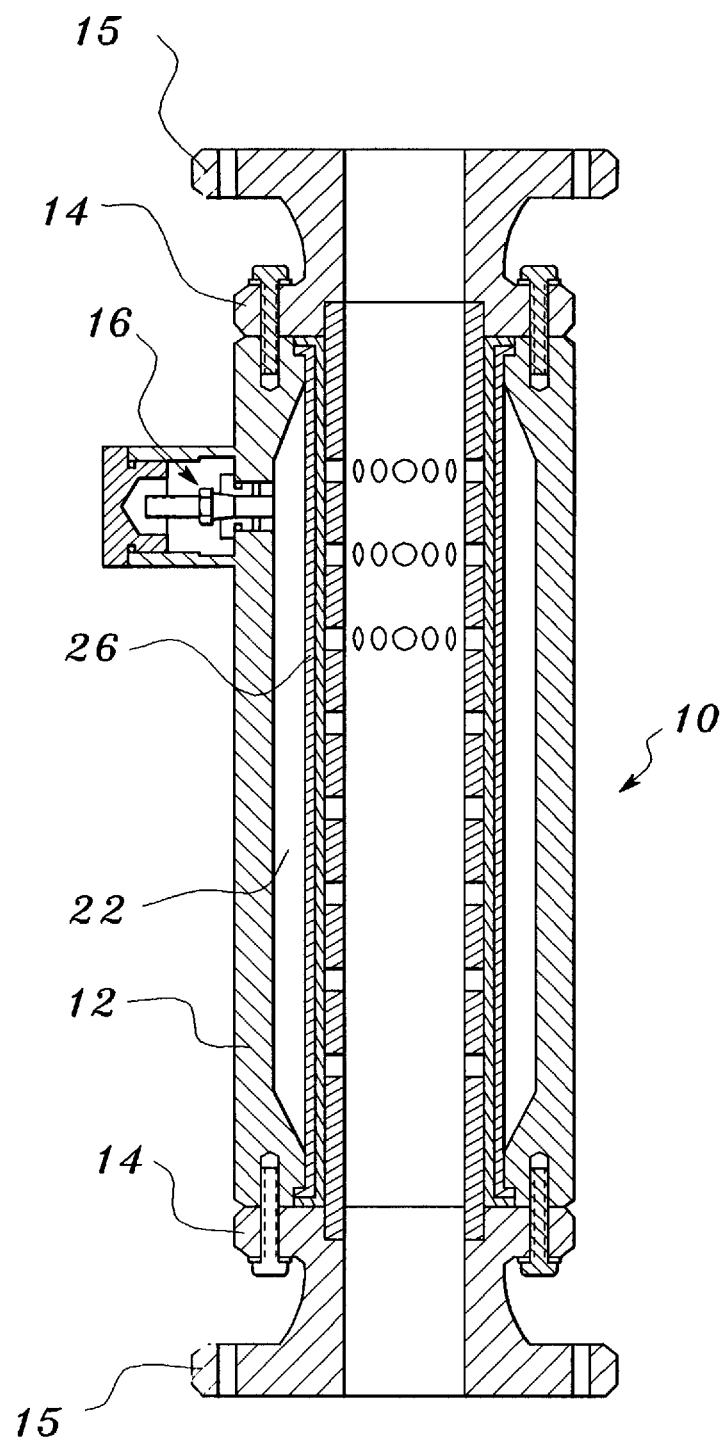
FIG. 1 is a cross section on view 1—1 of FIG. 3.

To aid in the correlation of the elements of the invention to the exemplary drawings, the following catalog of the elements is provided:

10 desurger assembly 20 orifice
12 case 22 gas chamber
14 casehead 24 pressure chamber
15 flange 26 sleeve
16 loading valve 28 liner
18 mandrel

DESCRIPTION OF THE PREFERRED EMBODIMENTS

The invention is described primarily in terms of an in-line desurger. Referring now to the drawings, FIG. 1 shows an in-line desurger 10 having a case 12 and caseheads 14; the caseheads 14 include means for mechanically connecting the desurger 10 to the line to be protected. The caseheads terminate in integral flanges 15 (for bolted connections) as shown in the drawings. Alternatively, the caseheads may be tapped for standard pipe threads, or may have beveled ends for welded connections.

Figure 2:
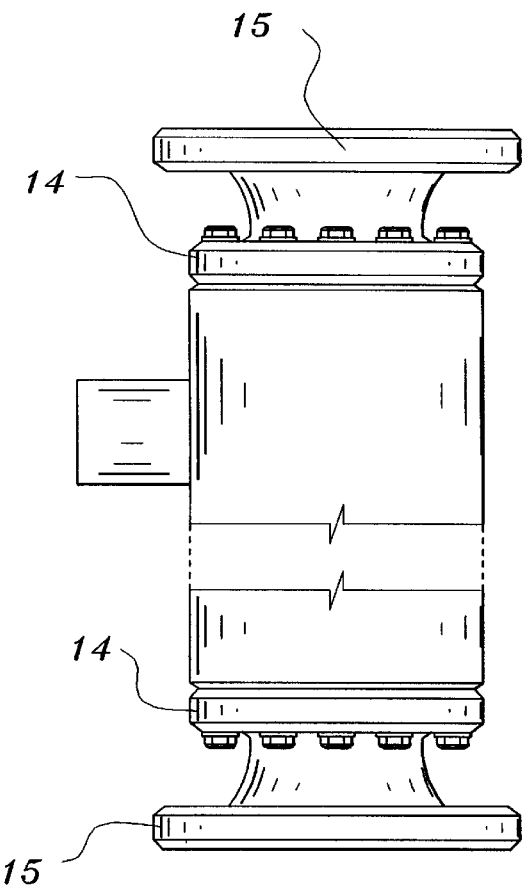
FIG. 2 is a side elevation of an in-line desurger unit.
Figure 3:
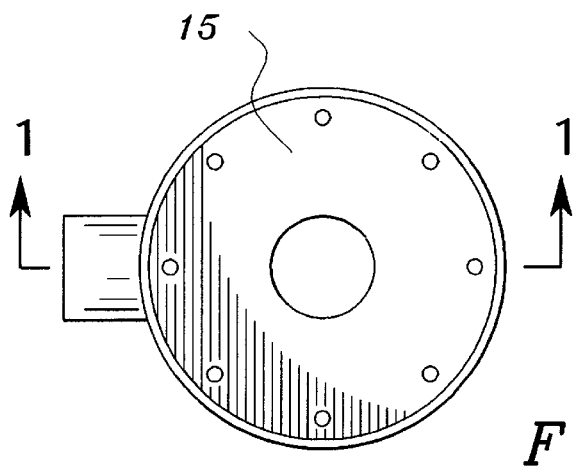
FIG. 3 is an end elevation of the desurger shown in FIG. 2.

Referring now to FIG. 2, the desurger 10 has a mandrel 18 perforated with orifices 20. Surrounding the mandrel 18, and extending the length of the desurger case 12 is a sleeve 26 of synthetic rubber or other suitable material. As described below, the sleeve surrounds a liner 28 of Teflon®; alternatively the sleeve includes an integral Teflon® liner. A gas chamber 22 surrounds the sleeve; the gas chamber is defined by the inner surface of case 12 and the outer surface of sleeve 26. Pressure within gas chamber 22 is adjustable by means of a loading valve 16 in the case, through which the gas chamber is charged.

As a pressure wave passes through the desurger, some of the liquid flowing through mandrel 18 is expelled through the orifices 20 in the mandrel, passing into the pressure chamber 24 between mandrel and sleeve. Energy is expended as the pressure wave causes the sleeve to expand against the gas charge contained in gas chamber 22. Absent a pressure surge, the gas in gas chamber 22 holds sleeve 26 against the mandrel. As the liner and sleeve are expanded outward by the pressure surge, the volume of pressure chamber 24 increases. Simultaneously, the volume of gas chamber 22 decreases, with a resultant increase in pressure inside the gas chamber. Energy spent in this manner dampens the amplitude of the pressure wave.

As the pressure in the pipe system returns to nominal values when the pressure wave passes, pressure in the gas chamber 22 forces the sleeve and liner back against the mandrel. Liquid which had flowed through the orifices into the pressure chamber is now forced from the pressure chamber back into the mandrel to become part of the flow through the pipe line. After the pressure event, the sleeve once again is held against the mandrel (by pressure in the gas chamber) and the volume of the pressure chamber is substantially zero. This design precludes retention of product material in the desurger and the resultant risk of contamination described under the description of the prior art.

In the present invention, the mandrel 18 is surrounded by a liner 28. The liner is made of polytetrafluoroethylene (PTFE), commonly known by its trademark Teflon®. The mandrel may be made either of stainless steel or of PTFE. As described above, the PTFE liner 28 is surrounded by sleeve 26; both liner and sleeve flex with the pressure surges, as the volume of the gas chamber and pressure chamber fluctuates. Because PTFE is somewhat gas-permeable, especially at higher temperatures, use of the non-permeable sleeve is necessary. The advantage of the PTFE liner is that PTFE is resistant to heat, to a maximum working temperature of about 500°, and is also resistant to the action of bacteria and of acidic liquids. In addition, the liner protects the sleeve from damage by hot and/or corrosive liquids within the pipe system.

Material within the pipe line, i.e. food-grade material or other product, contacts only the stainless steel of the mandrel or the PTFE liner when within the desurger. One embodiment includes a mandrel made of PTFE rather than stainless steel; in this embodiment, product flowing through the desurger would contact only PTFE.

The mandrel 18 has appropriately sized throttling orifices 20 through which liquid escapes during a pressure surge. Typically the orifices 20 are less than ¼ diameter. Pressure chamber 24 is outside the mandrel, between mandrel 18 and liner 28. The volume of pressure chamber 24 is substantially zero in the absence of a pressure surge, and increases in proportion to the excess applied pressure.

The outer boundary of pressure chamber 24 is defined by an inner surface of liner 28, which is made of PTFE or other suitable fluoropolymers. Immediately adjacent to and surrounding the liner is sleeve 26, which is typically made of neoprene; other suitable gas-resistant materials may be used. Sleeve 26 provides the resilience and flexibility necessary for the liner and sleeve to flex repeatedly over the lifetime of the unit. In one embodiment, the sleeve and liner are bonded together, i.e., made integral, and are installed in the desurger as one piece.

Figure 4:
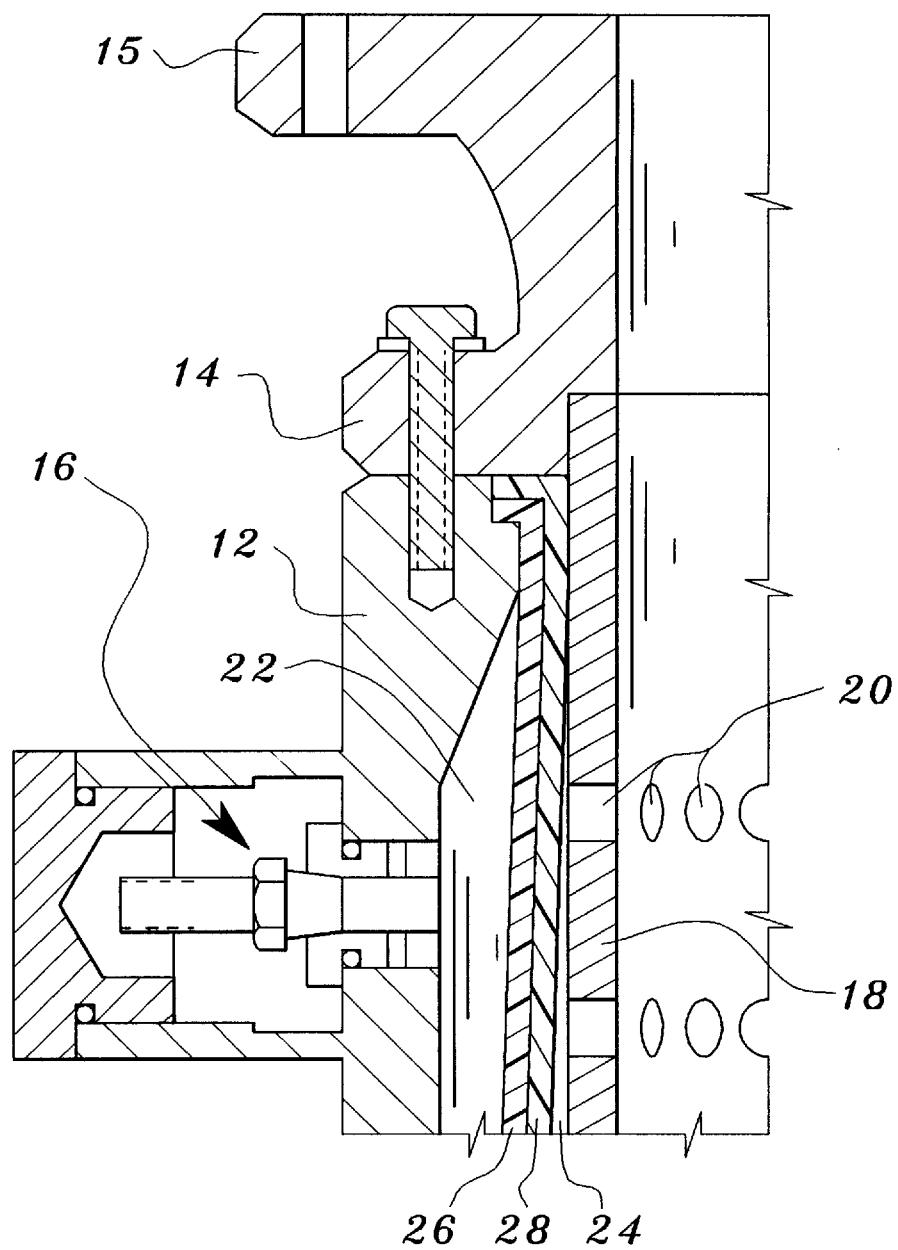
FIG. 4 is a detail from FIG. 1, showing the termination of the liner and sleeve at the casehead.

Each end of the liner/sleeve assembly is flared, with the projecting portions of each flared end being compressed between the plates of the caseheads which close the ends of the desurger case. This construction, illustrated in FIG. 4, provides a smooth transition between the PTFE of the liner and the stainless steel (or other metal) of the pipe. Compression of the liner and sleeve ends also seals gas chamber 22 from liquid in the pressure chamber or the mandrel.

As shown in FIG. 1 and in FIG. 4, mandrel 18 is longer than case 12, so that each end of the mandrel extends beyond the corresponding end of the case. The projecting ends of mandrel 18 are contained within a groove in the casehead 14. Assembly of the caseheads against the ends of the case compress the mandrel within the groove, locking the mandrel in position and forming a seal.

The restrictive description and drawings of the specific examples above do not point out what an infringement of this patent would be, but are to enable one skilled in the art to make and use the invention. Various modifications can be made in the construction, material, arrangement, and operation, and still be within the scope of my invention. The limits of the invention and the bounds of the patent protection are measured by and defined in the following claims.

I claim as my invention:

1. A desurger for dampening pulsations in a piping system containing material processed under conditions of high temperature to ensure sterility, comprising:

a case a casehead removeably attached to each end of said case, said casehead including means for attachment to a piping system, a mandrel contained within said case and providing a passage between said caseheads, said mandrel having a plurality of orifices in a wall thereof, a resilient liner surrounding and enclosing said mandrel, said liner being made of a fluoropolymer, a resilient sleeve surrounding and enclosing said liner, a pressure chamber between said mandrel and said sleeve so that said orifices communicate with said pressure chamber, and a gas chamber between said sleeve and said case, so that said liner and said sleeve cooperatively fluctuate responsive to pressure changes within the piping system.

2. The invention as described in claim 1, wherein said fluoropolymer is polytetrafluoroethylene.

3. The invention as described in claim 1, further comprising:

said liner and said sleeve each having a flared first end and a flared second end, a flared portion of said first end and a flared portion of said second end contained within a groove and secured therein by compression of said casehead against said case.

4. A desurger for dampening pulsations in a piping system containing material processed under conditions of high temperature to ensure sterility, comprising:

a case having two ends, a casehead removeably attached to each end of said case, said casehead including means for attachment to a piping system, a polytetrafluoroethylene mandrel contained within said case and providing a passage between said caseheads, said mandrel having a plurality of orifices in a wall thereof, a resilient polytetrafluoroethylene liner surrounding and enclosing said mandrel, a resilient sleeve surrounding and enclosing said liner, a pressure chamber between said mandrel and said sleeve so that said orifices communicate with said pressure chamber, and a gas chamber between said sleeve and said case, so that said liner and said sleeve cooperatively fluctuate responsive to pressure changes within the piping system.

5. The invention as described in claim 4, further comprising:

said liner and said sleeve each having a flared first end and a flared second end, a flared portion of said first end and a flared portion of said second end contained within a groove and secured therein by compression of said casehead against said case.

6. The invention as described in claim 4, wherein an end of said mandrel extends beyond an end of said case, said end of said mandrel terminating within a groove in said casehead and secured within said groove by compression of said casehead against said case.

* * * * *